United States Patent [19]
Yamana et al.

[11] 3,888,826
[45] June 10, 1975

[54] PROCESS FOR PREPARING AROMATIC POLYCARBONATES

[75] Inventors: Hirosuke Yamana, Nagoya; Tadashi Kunii, Tomotaka Furusawa, Yoshihiro Sugimura, Hiroshi Nakai, all of Yokkaichi; Yasuo Hiro, Suzuka, all of Japan

[73] Assignee: Mitsubishi Gas Chemical Co., Inc., Tokyo, Japan

[22] Filed: July 2, 1973

[21] Appl. No.: 375,492

[30] Foreign Application Priority Data
July 10, 1972 Japan............... 47-68253
Oct. 28, 1972 Japan.............. 47-107621

[52] U.S. Cl. ............. 260/47 XA; 260/463
[51] Int. Cl.................. C08g 17/13; C08g 35/00
[58] Field of Search .................. 260/47 XA

[56] References Cited
UNITED STATES PATENTS

| | | | |
|---|---|---|---|
| 3,022,272 | 2/1962 | Schnell et al. | 260/47 XA |
| 3,214,405 | 10/1965 | Crowe | 260/47 XA |
| 3,282,893 | 11/1966 | Shechter | 260/47 XA |
| 3,335,111 | 8/1967 | Pray et al. | 260/47 XA |
| 3,535,280 | 10/1970 | Schnell et al. | 260/47 XA |

Primary Examiner—Wilbert J. Briggs, Sr.
Attorney, Agent, or Firm—Frank J. Jordan

[57] ABSTRACT

A process for preparing aromatic polycarbonates from diphenyl carbonate and bisphenol A which comprises effecting preliminary polymerization under limited operational conditions to produce specific polycarbonate prepolymers and then subjecting the specific prepolymers to further polymerization for a shorter residence time thereby obtaining high molecular weight polycarbonates.

4 Claims, 1 Drawing Figure

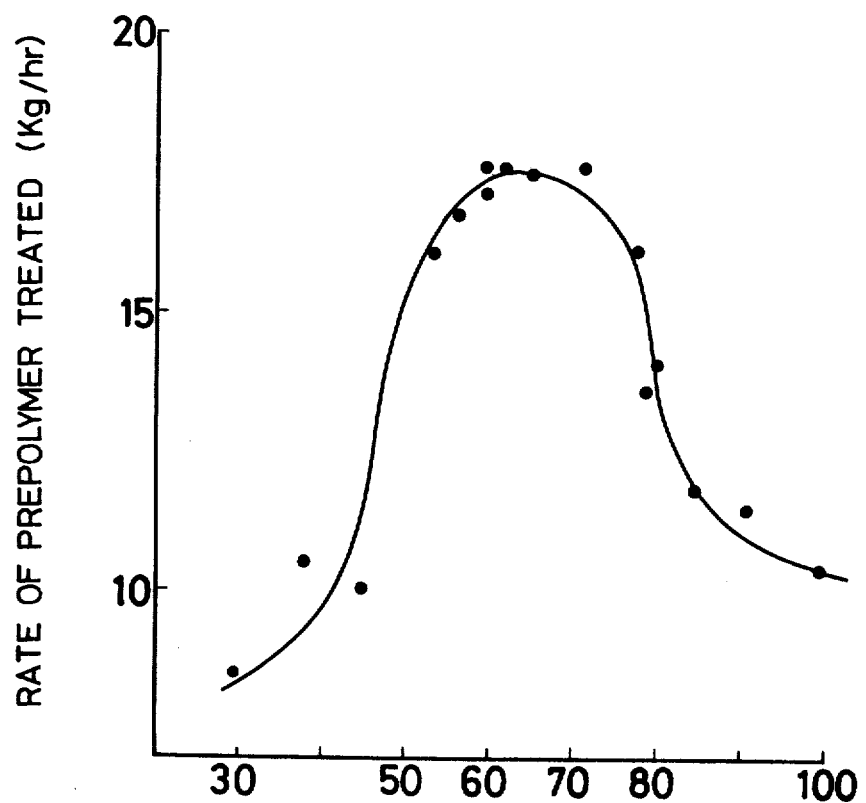

PROCESS FOR PREPARING AROMATIC POLYCARBONATES

The present invention relates to a process for preparing aromatic polycarbonates by interesterification between bisphenol A and diphenyl carbonate as a polycarbonate precursor, and more particularly to a continuous interesterifying process for the preparation of aromatic polycarbonates from specific polycarbonate prepolymers obtained by the reaction of bisphenol A and diphenyl carbonate.

Polycarbonates are superior in heat resistance, dimensional stability, electrical and other properties and they are therefore useful as engineering plastics. They are usually prepared by interesterifying diphenyl carbonate with bisphenol A or by reacting bisphenol A with phosgene in the presence of an acid acceptor and a suitable solvent.

The interesterifying process is advantageous in that the high molecular weight polycarbonate produced in the molten form may be extruded directly to form a final product in the pelletized form, since it does not use any solvent and therefore does not comprise the step of solvent removal.

Heretofore it has very often been experienced that in the preparation of aromatic polycarbonates by conventional interesterifying processes, the polycarbonates to be prepared are remarkably varied in properties depending upon various factors including not only the reaction conditions used but also the type and shape of the reactor used. The conventional interesterifying processes comprise the steps of producing a polycarbonate prepolymer or oligomer while distilling off phenol, produced as a by-product, to thereby remove it from the reaction system and melt polymerizing the prepolymer to convert it to a high molecular or final polycarbonate. It is customary that in the preliminary polymerization step (that is, in the step of the first half of said interesterification) the kind and shape of the reactor, the effect of agitation in the reactor, and the like are not particularly taken into consideration for improvement in reaction efficiency, and that in the finishing polymerization step the reaction temperatures are kept as high as possible to lower the viscosity of the reaction medium from the view-point of the high melt viscosity of both of the prepolymer to be melt polymerized and the resulting final polycarbonate and simultaneously to enhance the effect of agitation in the reactor, thereby increasing the reaction efficiency. It is not too much to say that both the polymerization time required for obtaining the desired polycarbonate and the quality thereof depend on the effect of agitation in the finishing polymerization step (that is, in the step of the latter half of said interesterification).

It is known that film evaporator type reactors, for example, centrifugal film evaporators, screw evaporators and the like are adopted as the reactor to shorten the polymerization time in the finishing polymerization step.

The present inventors have also adopted film evaporator type reactors in the finishing polymerization step of the interesterifying process and intensely investigated the effect of agitation on a polycarbonate prepolymer and a final polycarbonate, each in the molten form. As a result of their investigation they have confirmed that as compared with the conventionally known agitation tank-type reactors, the film evaporator-type reactors, for example, are capable of heightening the effect of agitation, thereby allowing the polymerization time to be remarkably shortened, while they have found that such film evaporator-type reactors when put to industrial use will not give products of stable and uniform quality nor allow the polymerization time to be easily controlled and will raise many other problems. As a result of their intense studies made in an attempt to solve these problems, they have found that when the film evaporator-type reactor is used and the polycarbonate prepolymer to be fed thereinto is limited to such a specific one as will be described later, a desired final polycarbonate will conveniently be obtained.

The primary object of the present invention is to provide an interesterifying process for preparing a polycarbonate of reliably uniform quality from the specified polycarbonate prepolymer in a shorter polymerization time.

This is accomplished by firstly making from bisphenol A and diphenyl carbonate a polycarbonate prepolymer wherein the number of terminal hydroxyl groups is 50–80% of that of the total terminal functional groups and which has a molecular weight (this term being used to mean "viscosity-average molecular weight" throughout the specification) of 12,000 or less, and secondly polymerizing the polycarbonate prepolymer in the molten state under a reduced pressure of not higher than 1 mmHg in a film evaporator-type reactor thereby obtaining an aromatic polycarbonate of desirably high degree of polymerization at an accelerated rate of polymerization. The aromatic polycarbonates so obtained are necessarily of superior quality.

It is generally known that in the preparation of a polymer by polycondensation, the molar ratio between materials to be condensation polymerized, the distribution of the terminal functional groups of a prepolymer to be produced, and the like will have delicate and remarkable effects on the rate of polymerization and the molecular weight of the polymer to be prepared.

Having investigated the behavior of an aromatic polycarbonate prepolymer in the molten state in an interesterifying process using a film evaporator-type reactor, the present inventors have found that when the prepolymer is one wherein the number of terminal hydroxyl groups is 50–80% of that of the total terminal functional groups and is used as a raw material for finishing polymerization (which is melt polymerization), the velocity of melt polymerization can be remarkably increased. This is apparent from, for example, the accompanying drawing in which the graph indicates the relation between the ratios of the number of the terminal hydroxyl groups to that of the total terminal functional groups in polycarbonate prepolymers and the amounts of prepolymer treated in a polymerization reactor per unit time, the relation being determined from the results obtained by melt polymerizing in a screw evaporator each of the prepolymers which had a molecular weight of, for example, approximately 9,100 and were differentiated in terminal hydroxyl group content from each other. This melt polymerization was effected in an attempt to obtain a polycarbonate having a molecular weight of 25,000 to 27,000. The graph will somewhat vary in shape depending upon the conditions such as the molecular weight of prepolymers used, the molecular weight of desired product polycarbonates, and reaction conditions. However, when such graphs are prepared on the basis of the results obtained by melt polymerization of the prepolymers under the same conditions except for their molecular weights being different from each other, the graphs will be substantially the same in shape and distributed in the ordinate direction in the figure since the higher the molecular weight of the prepolymer is, the higher the rate of the prepolymer treated. Accordingly it is preferable that the prepolymer used as the material for the desired polycarbonate be such that the number of its terminal hydroxyl groups is 50–80% of the number of the total terminal functional groups.

The use of such a specified prepolymer as mentioned above allows the use of a shorter melt polymerization time, that is, a shorter residence time in the film evaporator-type reactor in the prepolymer melt-polymerization step of the interesterifying process for the preparation of aromatic polycarbonates, thereby allowing the melt polymerization to be effected continuously and conveniently.

The present inventors have also found that the specified polycarbonate prepolymer according to the present invention should meet a further requirement in order to reliably obtain therefrom a final polycarbonate of superior quality.

The present inventors have found that there is a certain correlation between the molecular weight of the prepolymer and the physical properties, for example, the Izod impact strength of a final polycarbonate prepared from said prepolymer, in that, if the prepolymer has a molecular weight of more than 12,000, the Izod impact strength of the final product to be prepared from this prepolymer will remarkably decrease. Insofar as polycarbonates are used as engineering plastics, it is requisite for the polycarbonates to have, for example, a high Izod impact strength. Such requirement is important for the polycarbonates that have been prepared in the film evaporator-type reactor. The prepolymers according to the present invention should not exceed 12,000 in molecular weight as previously mentioned and, on the other hand, should preferably not be less than 5,000.

The aromatic polycarbonate prepolymers, obtained by the interesterifying process and usable in the practice of the present invention, are produced typically by reacting diphenyl carbonate with bisphenol A in the mixed molten state firstly at a temperature of 160–250°C and a reduced pressure for a period of 2–5 hours (preferably 3–4 hours), the reduced pressure being gradually decreased from 50–200 mmHg to 1–10 mmHg during said period, and lastly at a temperature of 240–270°C (preferably 240–250°C) and a reduced pressure of not higher than 5 mmHg (preferably, not higher than 1 mmHg) for a period of 1–30 minutes (preferably 5–15 minutes).

All of the known catalysts for interesterification may be used in the process of the present invention and may include, for example, alkali and alkaline earth metals and their oxides, hydroxides and phenolates; basic metal oxides such as zinc, lead and antimony oxides; and metal acetates such as calcium, manganese, zinc, lead, tin, cadmium and cobalt acetates.

Thus, there can be obtained the desired polycarbonate prepolymers having a molecular weight of from 5,000 to 12,000, wherein the number of the terminal hydroxyl groups is 50–80% of that of the total terminal groups.

The prepolymer so obtained is then fed to the reactor in the following step of finishing polymerization. In this case, the prepolymer from the preliminary polymerization step is directly and continuously fed to said reactor when this preliminary polymerization operation is carried out in a continuous fashion, whereas it is necessary to keep fluid for storage for a predetermined time before feeding to said reactor if said preliminary operation is conducted in a batch fashion. Polycarbonate prepolymers obtained by the preliminary polymerization described above, tend to crystallize remarkably easily and may crystallize at approximately 100 times the crystallization rate of the high molecular weight polycarbonates. Thus when it is desired that the prepolymers be kept fluid, their crystallization is sometimes allowed to proceed locally by means of cooling, resulting in the loss of their fluidity. In addition, they, as compared with the high molecular weight polycarbonates, are inferior in thermal stability and, when exposed to a high temperature for a long time, will remarkably deteriorate in color thereby degrading in quality the final polycarbonates to be prepared therefrom.

The polycarbonate prepolymers which have a molecular weight of not more than 12,000, preferably 5,000–12,000 and wherein the number of terminal hydroxyl groups is 50–80% of that of the total terminal functional groups, were investigated by the present inventors in an attempt to find temperatures at which they do not crystallize and are kept fluid enough to be conveniently subjected to finishing polymerization, without deteriorating in color so greatly that final products being prepared therefrom will degrade in quality. The result is that these prepolymers when heated to 230°–270°C, preferably 245°–255°C, are kept fluid enough to be conveniently fed to a reactor for finishing polymerization, without deteriorating in color. It has also been found that the prepolymers tend to crystallize when kept at a temperature of lower than 235°C that crystallization will proceed especially when they are kept at this temperature for a long time, and that, when kept at a temperature of higher than 270°C, they will substantially not crystallize but will be remarkably colored thereby remarkably degrading the resulting final polymers in color. This is undesirable.

As mentioned above, the prepolymers according to the present invention may be kept fluid at a temperature in the range of 235° to 270°C, preferably 245° to 255°C, if necessary. They are then fed to the film evaporator type reactor in order to obtain a final polycarbonate which is practically useful as contemplated by the present invention. This is substantiated by the following experiments.

EXPERIMENT 1

A polycarbonate prepolymer (Molecular Weight, 9,500; APHA, not more than 10), obtained by the interesterification of diphenyl carbonate and bisphenol A, was charged into a container provided with a heating jacket and it was then heated to 235°C and kept at this temperature for 18 hours. After the heating, it was found not to crystallize at all with an APHA of not more than 10. A final polycarbonate obtained from the prepolymer so heated had an APHA of 10.

EXPERIMENT 2

The same polycarbonate prepolymer as used in Experiment 1 was heated to 270°C and kept at this temperature for 18 hours without causing crystallization. After the heating, the prepolymer had an APHA of 10. A final polycarbonate prepared from said prepolymer so heated had an APHA of 15.

EXPERIMENT 3

A polycarbonate prepolymer (M.W., 10,700; APHA, not more than 10), obtained by the interesterification of bisphenol A and diphenyl carbonate, was placed in the same container as used in Experiment 1, heated to 240°C and kept at this temperature for 15 hours with the result of no crystallization at all. The prepolymer after the heating had an APHA of not more than 10, and a final polycarbonate prepared from this prepolymer had an APHA of 10.

COMPARATIVE EXPERIMENT 1

The same polycarbonate prepolymer as used in Experiment 1 was charged into the same container as used in Experiment 1, was heated to 225°C and kept at this temperature. Approximately 4 hours after having reached 225°C, the prepolymer was made white turbid; 10 hours after having reached said temperature, the crystallization of the prepolymer had proceeded to such an extent that the prepolymer could not be taken out of the container because it was a fluid. The crystallization degree of the crystal produced at this point was 15% as determined from its melting point peak area by differential thermal analysis.

COMPARATIVE EXPERIMENT 2

The same polycarbonate prepolymer as used in Experiment 1 was charged into the same container as used in said Experiment, heated to 285°C and kept at this temperature. Even 18 hours after having reached 285°C, the prepolymer was not found to cause crystallization but was remarkably colored. The prepolymer at this point had an APHA of 40, and a final polycarbonate prepared therefrom had an APHA of 50.

As mentioned above, it is necessary to store the prepolymer in the fluid state before feeding it to the reactor in the following step if the preliminary operation is conducted batchwise, whereas it is continuously fed directly to the reactor if said operation is conducted continuously.

The hot prepolymer still kept fluid is charged into a film evaporator-type reactor and then heated to a temperature of 230° to 330°C, preferably 280° to 320°C at an extremely reduced pressure of not more than 1 mmHg, preferably 0.1 to 0.6 mmHg for a maximum residence time of 30 minutes, usually 5 to 20 minutes, to obtain a desired final polycarbonate in the molten form, which may be extruded through the nozzles and cut into pellets if the evaporator is a screw evaporator.

According to the present invention, there may reliably be effected a continuous production of final polycarbonates having such high quality as to be usable as engineering plastics. The present invention will thus be highly appreciated from the economical and industrial point of view.

The present invention will be better understood by the following examples in which all parts are by weight unless otherwise specified.

EXAMPLE 1

A tank-type reactor provided with a stirrer was charged with 16 parts of bisphenol A, 15 parts of diphenyl carbonate and 0.00002 parts of sodium salt of bisphenol A. In the reactor the resulting mixture was heated to 180°C for melting and subjected to interesterification reaction at said temperature and a reduced pressure of 80 mmHg for 2 hours, then at 250°C and a reduced pressure of 2 mmHg for 2 hours and finally at this temperature and a reduced pressure of not higher than 1 mmHg for 5 minutes, thereby obtaining a polycarbonate prepolymer having a molecular weight of 8,600 wherein the number of terminal hydroxyl groups was 61% of that of the total terminal functional groups.

The prepolymer kept fluid at 248°C, was supplied to a screw evaporator wherein it was subjected to finishing polymerization at 310°C and a reduced pressure of 0.3 to 0.4 mmHg for a residence time of 15 minutes, thereby obtaining a final polycarbonate having a molecular weight of 26,500.

COMPARATIVE EXAMPLE 1-2

A polycarbonate prepolymer, which had a molecular weight of 9,500 and wherein the number of the terminal hydroxyl groups was 96% of that of the total terminal functional groups, was charged into the screw evaporator previously used in Example 1 and subjected to finishing polymerization under the same temperature and pressure as used in Example 1. The final polycarbonate so obtained had a molecular weight of 26,500 but it took 35 minutes, a longer residence time than in Example 1, to be obtained from said prepolymer.

It has also been found that when subjected to finishing polymerization under the same temperature and pressure as above, a polycarbonate prepolymer which had a molecular weight of 9,000 and wherein the number of the terminal hydroxyl groups was only 35% of that of the total terminal functional groups, required a residence time of 28 minutes for polymerization to a final polycarbonate having a molecular weight of 25,000, to occur.

EXAMPLE 2

Into a tank-type reactor fitted with a stirrer 16 parts of bisphenol A, 15 parts of diphenyl carbonate and 0.00003 parts of the sodium salt of bisphenol A were charged to form a mixture thereof which was then treated under substantially the same operational conditions as used in Example 1 to produce a polycarbonate prepolymer which had a molecular weight of 9,300 and wherein the number of the terminal hydroxyl groups was 70% of the number of the total terminal functional groups. The prepolymer, while in the fluid state, was fed to the same screw evaporator as used in Example 1 and subjected to finishing polymerization at the same temperature and pressure as used in Example 1, for a residence time of about 12 minutes, thereby obtaining a final polycarbonate having a molecular weight of 27,300. The final polycarbonate so obtained was formed to test pieces which were tested for their Izod impact strength and tensile strength at the break point with the result that the former was 17.0 ft·lb/in (notched) and the latter 740 Kg/cm$^2$.

COMPARATIVE EXAMPLE 3

A polycarbonate oligomer of a molecular weight of 12,700, wherein the number of the terminal hydroxyl groups was 58% of that of the total terminal functional groups, was subjected to finishing polymerization using the same screw evaporator under the same conditions as used in Example 2 thereby to obtain a final polycarbonate having a molecular weight of 27,500. The final polycarbonate had an Izod impact strength of no more than 15.5 ft·lb/in (notched) and tensile strength at the break print of only 670 Kg/cm².

What is claimed is:

1. In a process for preparing an aromatic polycarbonate by interesterifying diphenyl carbonate and bisphenol A in the presence of a catalyst for the interesterification, the improvement comprising the steps of:
   1. effecting a continuous or batch polymerization of diphenyl carbonate and bisphenol A firstly at a temperature of 160°–250°C and a reduced pressure for a period of 2–5 hours, the reduced pressure being gradually decreased from 50–200 mmHg to 1–10 mmHg during said period, and lastly at a temperature of 240°–270°C and a reduced pressure of not higher than 5 mmHg for a period of 1–30 minutes to produce a polycarbonate prepolymer having a viscosity-average molecular weight of 5,000–12,000 wherein the number of the terminal hydroxyl groups is 50–80% of that of the total terminal functional groups, and then
   2. feeding the thus-produced polycarbonate prepolymer continuously to a film evaporator type reactor wherein the prepolymer is subjected to further polymerization at a temperature of 230°–330°C and a reduced pressure of not higher than 1 mmHg for a residence time of 5–30 minutes to obtain a high molecular weight, aromatic polycarbonate.

2. A process according to claim 1, wherein the reduced pressure in the step (2) is in the range of from 0.1 to 0.6 mmHg.

3. A process according to claim 1, wherein the batch polymerization is effected in the step (1) and the prepolymer so obtained is stored in the molten state at a temperature of 235°–270°C before being fed to said reactor.

4. In a process for preparing an aromatic polycarbonate by polymerizing a polycarbonate prepolymer of diphenyl carbonate and bisphenol A at a temperature of 230°–330°C and a reduced pressure of not more than 1 mmHg in a film evaporator-type reactor for a residence time of 5–30 minutes, the improvement comprising the polycarbonate prepolymer being a viscosity-average molecular weight of 5,000–12,000 wherein the number of terminal hydroxyl groups is 50–80% of that of the total terminal functional groups.

* * * * *